United States Patent

Razavi

Patent Number: 6,153,309
Date of Patent: Nov. 28, 2000

[54] UV-PROTECTED VINYL LAMINATES

[76] Inventor: Homaune A. Razavi, 832 Judson Manor Dr., Chesterfield, Mo. 63141

[21] Appl. No.: 08/270,198

[22] Filed: Jul. 1, 1994

[51] Int. Cl.⁷ .......................... B32B 27/08; B32B 27/16; B32B 27/30
[52] U.S. Cl. ....................... 428/522; 428/36.6; 428/36.7; 428/520
[58] Field of Search ...................... 428/515, 516, 428/518, 520, 522, 523, 500, 36.6, 36.7, 913, 914

[56] References Cited

U.S. PATENT DOCUMENTS

| | | | |
|---|---|---|---|
| 4,100,318 | 7/1978 | McCann et al. | 428/159 |
| 4,166,881 | 9/1979 | Congdon et al. | 428/463 |
| 4,495,325 | 1/1985 | DeBaergalis et al. | 524/507 |
| 4,533,595 | 8/1985 | Olson et al. | 428/336 |
| 4,585,693 | 4/1986 | DeBergalis et al. | 428/324 |
| 4,605,592 | 8/1986 | Paquette et al. | 428/334 |
| 4,902,378 | 2/1990 | Ouderkirk et al. | 156/643 |
| 5,069,964 | 12/1991 | Tolliver et al. | 428/325 |
| 5,254,525 | 10/1993 | Nakajima et al. | 503/227 |
| 5,280,124 | 1/1994 | Winter et al. | 548/259 |
| 5,298,361 | 3/1994 | Bonham | 430/260 |

FOREIGN PATENT DOCUMENTS

| | | | |
|---|---|---|---|
| 9400524 | 1/1994 | WIPO | C09D 157/00 |

*Primary Examiner*—Vivian Chen
*Attorney, Agent, or Firm*—Howrey Simon Arnold & White, LLP

[57] ABSTRACT

A yellow-resistant vinyl film laminate comprising a plasticized polyvinylchloride layer and a UV cured top which contains active UV-activatable, free radical-generating species, wherein the free radical-generating species and the plasticizer are sufficiently immiscible so as to avoid reactions in the presence of UV light which produce yellowing of the polyvinylchloride layer.

2 Claims, No Drawings

cialy polyvinylchloride (PVC) films coated with a UV-cured polymer film and methods of making and using such UV-protected vinyl laminates.

UV-PROTECTED VINYL LAMINATES

Disclosed herein are UV-protected vinyl laminates especially polyvinylchloride (PVC) films coated with a UV-cured polymer film and methods of making and using such UV-protected vinyl laminates.

BACKGROUND OF THE INVENTION

PVC films are typically heavily loaded with plasticizer to provide durability and resistance against cracking. It has long been known that PVC will yellow due to exposure to UV light that are believed to generate free radicals in the polymer. The incorporation of UV stabilizers into PVC allows the production of stabilized vinyl films to have substantially reduced tendency toward yellowing from UV light exposure. In the recent years, however, there has been a general trend in certain applications to coat vinyl films with UV-cured top coats to increase the gloss, abrasion resistance and gloss retention. Applications where vinyl is coated with a UV-cured top coat include decals, labels and vinyl flooring.

Certain tests support a belief that the use of UV stabilizers is sufficient to stabilize UV-cured top-coated vinyl against yellowing. For instance, samples of freshly-prepared, UV-cured top-coated vinyl films that are exposed to artificial accelerated UV light sources, e.g. Atlas Corporation's Xenon weatherometer, show significant resistance toward yellowing.

I have discovered that if the same UV-cured top-coated, UV-stabilized vinyl films are allowed to age, e.g. by exposure to time or heat, the vinyl films will yellow significantly with exposure to UV light. Interestingly enough, the vinyl layer and not the UV-cured top coating appears to be the layer that is susceptible to yellow under aging conditions. UV-cured top coatings include acrylate monomer and urethane-acrylate formulations containing a UV activated polymerization initiator species. UV initiator species are typically molecules designed to absorb UV light and break down to generate radicals that can initiate the polymerization of the monomers. It is known by practitioners in the UV-coating industry that the curing process does not consume all of the UV initiator species that are present in coating formulations. I believe the cause of this delayed yellowing phenomena upon aging is due to the plasticizer in the vinyl migrating into contact with the UV-cured top coating, thereby providing a path for the unreacted initiator migrate to the vinyl layer. In the vinyl layer, the initiator can, when exposed to UV light, generate radicals which can degrade the vinyl or additives such as plasticizers, manifested as yellowing.

SUMMARY OF THE INVENTION

I have discovered that delayed yellowing of aged, UV-stabilized vinyl that has a UV-cured top coat can be substantially eliminated. This invention provides yellow-resistant, vinyl film laminates comprising (a) a plasticized polyvinylchloride layer and (b) a UV-cured top coat containing active UV-activatable, free radical-generating species. These yellow-resistant vinyl laminates can be provided by blocking UV light from penetrating the vinyl layer, e.g. by incorporating into the laminate a layer of UV-absorbing polymer. Alternatively, yellow-resistant vinyl laminates can be provided by incorporating a barrier layer that blocks migration of plasticizer to the UV-cured top coating. Yellow-resistant vinyl laminates can also be provided by employing a UV-cure initiator that remains essentially fixed in the top coating or an initiator that is substantially immiscible with the plasticizer for the vinyl.

DETAILED DESCRIPTION OF PREFERRED EMBODIMENTS

The delayed yellowing-resistant, vinyl laminates of this invention comprise a layer of plasticized polyvinyl chloride having a protective top coat of a UV-cured polymer. Because polyvinyl chloride is inherently brittle or intractable, it is typically formulated with a plasticizer compound, typically a low molecular weight compound that is designed to migrate throughout the vinyl polymer chains to provide flexibility to the polymer. Vinyl polymer layers often contain UV-absorbing compounds, e.g. benzotriazoles. Because such UV-absorbing compounds are present in low concentrations and are dispersed through the compound they are typically ineffective in the prevention of yellowing with aging.

Protective top coats as used with vinyl laminates are well known in the art and typically comprise a UV-cured clear coating of an acrylate or urethane polymer that is prepared from a coating formulation of acrylate monomers or urethane-acrylates and a UV activated polymerization initiator species. UV initiator species are typically molecules designed to absorb UV light and break down to generate radicals that can initiate the polymerization of the monomers. Such coatings are typically prepared using an excess of UV initiator species. It is believed that the mechanism for yellowing on aging of such laminates is due, at least to a significant degree, to migration of plasticizer into contact with the free radical-generating initiator-containing top coat. This allows the initiator species to associate with plasticizer and migrate into the vinyl layer which is susceptible to yellowing due to the action of free radicals generated by the effect of UV light on initiator located in the vinyl layer.

Thus, the yellowing-resistant vinyl laminates of this invention can be provided by employing means to keep free radical-generating initiator out of the vinyl layer. This can be provided by preparing the laminates with a barrier layer between the plasticized vinyl layer and the UV-cured top coat containing active UV-activatable, free radical-generating species. The barrier layer can comprise any polymer that serves as a barrier to the migratory action of the plasticizer species, e.g. polyethylene or polyurethane. Alternatively, the tendency of UV-initiator species to migrate to the vinyl layer can be retarded by employing a high molecular weight initiator, e.g. a polymer having free radical-generating functional groups, or by employing a UV-initiator species that is substantially immiscible with the plasticizer.

If the free radical-generating initiator is allowed to accumulate in the vinyl layer, the yellowing-resistant vinyl laminates of this invention can be provided by employing means to keep UV light from penetrating the vinyl layer, e.g. a barrier coating that effectively absorbs UV light that might otherwise penetrate the vinyl layer. Such UV barrier layers can be provided by incorporating into the laminate a layer of UV-absorbing polymer between the vinyl layer and the top coat or above the top coat. Alternatively, the UV barrier layer can comprise a polymer layer containing UV absorbing additives. Such UV-absorbing polymers can comprise a copolymer of an acrylate and a acrylate functionalized UV-absorbing monomer species such as an acrylate functionalized benzotriazole or acrylate functionalized benzophenone. The acrylate species can include any of the commonly used acrylate monomers such as methylmethacrylate, butyl acrylate and the like. Preferred UV-absorbing copolymers comprise about 40 to 75 weight percent of the UV-absorbing monomer species. UV-absorbing polymer layers are conveniently applied from aqueous emulsions of the UV-absorbing copolymer. Such emulsions typically contain acrylic copolymer solids (about 40%), surfactants (about 3%), coalescing agents (about 10%), biocides (about 0.1%) and buffers (about 0.2%). Useful coalescing agents for acrylic emulsions include dipropyleneglycol methylether and N-methyl pyrollidone.

The laminates of this invention are useful in any of a variety of applications where UV-cured top coats are applied to vinyl layer. Common applications include vinyl flooring, decorative adhesive laminates, labels, wallpaper, building materials such as siding and the like.

The invention is now described with reference to the following examples which are for purposes of illustration only and are not intended to imply any limitation on the scope of the invention.

EXAMPLE 1

This example illustrates the practice of prior art practitioners indicating that fresh samples of UV-cured, top-coated vinyl film is essentially resistant to UV light-induced yellowing and that UV-absorbing coatings provide little improvement in resistance to yellowing. Two samples of vinyl laminate suitable for flooring applications were prepared comprising a UV-stabilized, plasticized PVC layer and a UV-cured urethane top coat. Sample 1A was coated with a 25 micrometer wet film of UV barrier layer comprising a 1:1 copolymer of butyl methacrylate and 2(2'-hydroxy-5-methacryloxyethylphenyl)-2H-benzotriazole from a 40% solids, water-based latex. Sample 1B was not coated. Both samples were place in a Atlas Corporation xenon weatherometer and exposed continuously to the output of the xenon lamp for 400 hours according to ASTM G26. The samples were analyzed for yellowing using a colorimeter manufactured by ACS Corporation according to yellow index scale described in ASTM E313. The results are reported below in Table 1.

TABLE 1

| Sample | Yellow Index | |
|--------|--------------|------------------|
|        | As Made      | After UV Exposure |
| 1A     | 3            | 5                |
| 1B     | 1            | 7                |

EXAMPLE 2

This example illustrates that UV-stabilized, plasticized vinyl film that is in contact with a layer containing UV-activated, free radical-generating species becomes significantly susceptible to yellowing on aging, i.e. exposure of the passing of time at ambient temperature. This example further illustrates that the application of a UV-absorbing layer can substantially reduce the tendency toward yellowing by reducing or eliminating the presence of UV light in a vinyl layer in contact with free radical generating species. Vinyl laminate samples 2A and 2B of UV-stabilized, plasticized PVC layer and a UV-cured urethane top coat were prepared in the manner of Example 1. After the samples were aged for several months at ambient temperature, a UV-absorbing coating was applied to sample 2A. After the samples were exposed in a xenon weatherometer in the manner of Example 1, a yellowing index was determined as reported below in Table 2.

TABLE 2

| Sample | Yellow Index | |
|--------|--------------|------------------|
|        | As Made      | After UV Exposure |
| 2A     | 5            | 5                |
| 2B     | 3            | 31               |

EXAMPLE 3

This example illustrates that UV-stabilized, plasticized vinyl film that is in contact with a layer containing UV-activated, free radical-generating species becomes significantly susceptible to yellowing on aging, i.e. exposure of the film to moderate heat. This example further illustrates that the application of a UV-absorbing layer can substantially reduce the tendency toward yellowing by reducing or eliminating the presence of UV light in a vinyl layer in contact with free radical generating species. Vinyl laminate samples 3A and 3B of UV-stabilized, plasticized PVC layer and a UV-cured urethane top coat were prepared in the manner of Example 1; a UV-absorbing coating was applied to sample 3A. After the samples were aged for 3 days at 65° C., the samples were exposed in a xenon weatherometer in the manner of Example 1; a yellowing index was determined as reported below in Table 3.

TABLE 3

| Sample | Yellow Index | |
|--------|--------------|------------------|
|        | As Made      | After UV Exposure |
| 3A     | 3            | 9                |
| 3B     | 1            | 26               |

EXAMPLE 4

This example illustrates that UV-stabilized, plasticized vinyl film that is not in contact with UV-activatable, free radical-generating species exhibits some limited tendency to yellow on exposure to UV light and that this tendency can be reduced by use of UV-absorbing coatings. UV-stabilized, plasticized vinyl film was prepared; part of the film coated with a UV-absorbing coating as in Example 1 is designated as sample 4A; the uncoated vinyl film is designated as sample 4B. After the samples were aged for 3 days at 65° C., the samples were exposed in a xenon weatherometer in the manner of Example 1; a yellowing index was determined as reported below in Table 4.

TABLE 4

| Sample | Yellow Index | |
|--------|--------------|------------------|
|        | As Made      | After UV Exposure |
| 4A     | 2            | 7                |
| 4B     | 1            | 12               |

The above examples show that as the sample sit for long periods, the initiator can migrate to the vinyl and lead to the yellowing of the film. If the UV light is blocked so that it can not get to the UV initiators, the radical generation process is inhibited and the yellowing of the film is stopped.

While specific embodiments have been described herein, it should be apparent to those skilled in the art that various modifications thereof can be made without departing from the true spirit and scope of the invention. Accordingly, it is intended that the following claims cover all such modifications within the full inventive concept.

What is claimed is:

1. A yellow-resistant, vinyl film laminate comprising (a) a plasticized polyvinylchloride layer, and (b) a UV-cured top coat containing active UV-activatable, free radical-generating species, wherein said free radical-generating species and said plasticizer are sufficiently immiscible as to avoid reaction in the presence of UV light to an extent sufficient to cause yellowing of the polyvinylchloride layer.

2. A method for substantially eliminating yellowing from exposure to UV light of a laminate of a UV-stabilized vinyl film layer and a UV-cured top coat layer, comprising reducing the migration of free radical-generating species from the top coat layer into the vinyl film layer by providing in the top coat layer of the laminate free radical-generating species that are immiscible with the plasticizer in the vinyl layer.

* * * * *